United States Patent
Swami et al.

(10) Patent No.: US 7,613,193 B2
(45) Date of Patent: Nov. 3, 2009

(54) APPARATUS, METHOD AND COMPUTER PROGRAM PRODUCT TO REDUCE TCP FLOODING ATTACKS WHILE CONSERVING WIRELESS NETWORK BANDWIDTH

(75) Inventors: Yogesh P. Swami, Irving, TX (US); Franck Le, Pittsburgh, PA (US)

(73) Assignee: Nokia Corporation, Espoo (FI)

( * ) Notice: Subject to any disclaimer, the term of this patent is extended or adjusted under 35 U.S.C. 154(b) by 611 days.

(21) Appl. No.: 11/347,335

(22) Filed: Feb. 3, 2006

(65) Prior Publication Data
US 2006/0230129 A1  Oct. 12, 2006

Related U.S. Application Data

(60) Provisional application No. 60/650,156, filed on Feb. 4, 2005.

(51) Int. Cl.
*H04L 12/28* (2006.01)
(52) U.S. Cl. .................. 370/395.52; 370/392; 370/349; 370/351; 726/11; 726/4; 726/17; 726/21; 709/228; 709/229
(58) Field of Classification Search .................. 726/11, 726/12; 370/401, 471, 349, 220, 335, 329, 370/352, 229, 235; 709/227, 250, 203
See application file for complete search history.

(56) References Cited

U.S. PATENT DOCUMENTS

| | | | |
|---|---|---|---|
| 7,197,639 B1 * | 3/2007 | Juels et al. ................. | 713/168 |
| 7,234,161 B1 * | 6/2007 | Maufer et al. ............... | 726/12 |
| 7,398,315 B2 * | 7/2008 | Atkinson et al. ............ | 709/227 |
| 2001/0042200 A1 * | 11/2001 | Lamberton et al. .......... | 713/151 |
| 2003/0179885 A1 * | 9/2003 | Gentry et al. .............. | 380/277 |
| 2004/0034773 A1 * | 2/2004 | Balabine et al. ............ | 713/168 |
| 2004/0062267 A1 * | 4/2004 | Minami et al. ............. | 370/463 |

(Continued)

FOREIGN PATENT DOCUMENTS

EP   1379055 A1   1/2004

(Continued)

OTHER PUBLICATIONS

"RFC 793 Transmission Control Protocol", published by information Sciences Institue on Sep. 1981. See whole document.*

(Continued)

*Primary Examiner*—Pankaj Kumar
*Assistant Examiner*—Yosief Berhane
(74) *Attorney, Agent, or Firm*—Harrington & Smith, PC

(57) ABSTRACT

A method for operating a firewall includes: in response to the firewall receiving a TCP SYN request packet that is sent towards a first node from a second node, the TCP SYN request packet comprising a sequence value ("seq"), sending to the second node a SYN|ACK packet, the SYN|ACK packet comprising a seq and an ack_sequence value ("ack_seq"), where ack_seq of the SYN|ACK packet is not equal to the TCP SYN request packet's seq+1; and in response to the firewall receiving a TCP RST packet from the second node, verifying that the seq in the TCP RST packet matches the ack_seq of the SYN|ACK packet and, if it does, designating the connection with the second node as an authorized connection.

21 Claims, 7 Drawing Sheets

U.S. PATENT DOCUMENTS

| | | | |
|---|---|---|---|
| 2004/0131059 A1* | 7/2004 | Ayyakad et al. | 370/389 |
| 2005/0021999 A1* | 1/2005 | Touitou et al. | 713/200 |
| 2005/0027854 A1* | 2/2005 | Boulanger et al. | 709/224 |
| 2005/0240989 A1* | 10/2005 | Kim et al. | 726/11 |
| 2007/0044150 A1* | 2/2007 | Dalal et al. | 726/22 |

FOREIGN PATENT DOCUMENTS

| | | |
|---|---|---|
| WO | WO-98/34384 | 8/1998 |
| WO | WO-03/050644 A2 | 6/2003 |

OTHER PUBLICATIONS

"More information on RST cookies" Clavister [Knowledge Base Article #1006], Published: Jun. 4, 2003, [on line] Internet: http://www.clavister.com/support/kb/10006/.

Chau, H., "Network Security—Defense Against DoS/DDoS Attacks", Sep. 22, 2004, [on line] Internet: http://www.securitydocs.com/library/2576.

"3GPP2 Network Firewall Configuration and Control- Stage 1 Requirements", Dec. 2004, 16 pages.

"The Design and Implementation of Network Puzzles", Wu-chang Feng et al., Proceedings of INFOCOM 2005, Mar. 2005, 11 pages.

"SYN cookies", D. J. Bernstein, (http://cr.yp.tosyncookies,html), 3 pages, Feb. 2006.

"Resisting SYN flood DoS attacks with a SYN cache", Jonathan Lemon, Proceedings of USENIX BSDCon 2002, Feb. 2002, 9 pages.

"RFC793 Transmission Control Protocol", DARPA Internet Program, Protocol Specification, Sep. 1981, pp. 1-85.

"RFC3220 IP Mobility Support for IPv4", C. Perkins, (Ed.), Network Working Group, Jan. 2002, pp. 1-92.

* cited by examiner

APPARATUS, METHOD AND COMPUTER PROGRAM PRODUCT TO REDUCE TCP FLOODING ATTACKS WHILE CONSERVING WIRELESS NETWORK BANDWIDTH

CROSS-REFERENCE TO RELATED APPLICATIONS

This patent application claims priority under 35 U.S.C. §119(e) from Provisional Patent Application No. 60/650,156 filed Feb. 4, 2005, the disclosure of which is incorporated by reference herein in its entirety.

TECHNICAL FIELD

The teachings in accordance with the exemplary embodiments of this invention relate generally to communication network security procedures and, more specifically, relate to security procedures for use in wireless communications networks to protect against Transport Control Protocol (TCP) flooding attacks and other similar types of malicious behavior.

BACKGROUND OF THE INVENTION

Various types of attacks are possible in the Internet, such as those known as the TCP SYN flood, Ping of Death and Land attacks. In addition to being vulnerable to all of these, wireless communications networks, including cellular networks, present characteristics that make them vulnerable to new attacks, or even more vulnerable to current existing ones. For example, the air interface of cellular networks is a scarce, limited and expensive resource that a user is required to pay for. As a result, new types of attacks are specifically directed to disrupting the air interface, such as an overbilling type of attack reported to the GSM Association in 2002. In brief, this attack operated by flooding arbitrary victims using TCP connections that were preestablished and left unclosed by the malicious party. The overbilling attack, operated with private and public Internet Protocol (IP) addresses, did not require the victim to establish a connection and bypassed (stateful) firewalls. The overbilling attack was equally effective whether the victim was in his home network or was roaming.

Unsolicited incoming traffic can lead to many undesired effects for both the subscriber and the operator. These include, but are not limited to, overbilling attacks, unnecessary consumption of the network operator's resources and a reduction in the victim battery's lifetime. However, in order to support Push Services and other future applications and scenarios (e.g., wireless terminals that host servers), valid incoming packets must be able to reach the wireless terminal of a cellular user. Unfortunately, this requirement opens the door for even more attacks on wireless terminals (also referred to as Mobile Stations (MSs), such as cellular telephones and other types of wireless-enabled devices, including personal digital assistants (PDAs)).

The 3GPP2 standards have recognized this problem, and a Network Firewall Control and Configuration (NFCC) effort has examined possible solutions to minimize unsolicited traffic and also minimize the opportunities for external parties to maliciously attack mobile stations (see 3GPP2 Network Firewall Configuration and Control—Stage 1 Requirements, December 2004).

Most applications supported thus far in cellular networks are based on the client-server model (e.g., web browsing) where cellular subscribers connect to servers in the external networks. With the connections being initiated by the wireless terminals, the deployment of stateful inspection packet filters has thus far provided adequate protection for both users and operators (see, for example, Check Point NG VPN-1/ FireWall-1; Jim Noble et al., Syngress Publishing Inc., 2003).

However, when considering new applications (e.g., Push Services and Peer-to-Peer (P2P) applications) and scenarios to be supported (e.g., wireless terminals hosting servers), wireless terminals will not always be clients, but may instead function as servers. As a consequence, connections may have to be initiated by end points in the external networks towards the wireless terminals in the cellular networks, and incoming packets must be able to reach the wireless terminals.

This type of operation may, however, lead to different types of attacks since incoming traffic may be malicious traffic. Referring to FIG. 1A, a malicious node 1 may be sending traffic via external networks 2, such as the Internet, through a firewall 3 to the cellular network 4. From the cellular network 4, the malicious traffic passes through the air interface 5 to the victim wireless terminal 6. The wireless terminal 6 is assumed to be associated with a cellular network subscriber. This can result in various problems in the cellular network 4, such as the above-noted problems related to overbilling, reduction in the victim's battery lifetime, and unnecessary consumption of air interface bandwidth.

What is needed, therefore, is a technique to minimize the unsolicited traffic towards the wireless terminal 6, and, more specifically, a technique to reduce the occurrence or likelihood of an attack on wireless (e.g., cellular) network subscribers.

In 3GPP2, a suggestion has been made to use the following method to reduce the threat of malicious incoming traffic to the wireless terminal 6: It was suggested that every first incoming packet should pass the firewall 3 protecting the cellular network 4; if the terminal 6 decides to accept the invitation and set up the connection, the terminal 6 replies, and based on the terminal's reply, the firewall 3 creates a state for subsequent packet(s) corresponding to this flow; if the terminal 6 decides not to accept the connection, it does not reply. In the absence of a reply from the terminal 6, the firewall 3 blocks all subsequent incoming packets corresponding to this flow.

This proposed solution presents several issues, and does not actually reduce the threat, since in most Denial of Service (DoS) attacks the source IP address field is forged. As such, the malicious node 1 may thus still flood cellular subscribers with invalid incoming traffic (the malicious node 1 need only send many "first messages" whose source IP address is randomly created).

Other solutions to this problem have been suggested. For example, Feng et al. have suggested the use of a challenge-response based method at the IP layer, re-using puzzles to verify the validity of the source IP address of the packets (Wu-chang Feng, Ed Kaiser, Wu-chi Feng, Antoine Luu, "The Design and Implementation of Network Puzzles", in Proceedings of INFOCOM 2005, March 2005). However, adoption of this approach would require modifications to the Internet Protocol (v4 and v6).

P2P applications, HTTP and most other applications run over TCP. Several extensions to TCP have been proposed to reduce potential DoS attacks, including the use of TCP cookies (see SYN cookies, D. J. Bernstein, at http://cr.yp.to/syn-cookies.html) and the TCP cache (see, Resisting SYN flood DoS attacks with a SYN cache, J. Lemon, in Proceedings of USENIX BSDCon 2002, San Francisco, February 2002). However, these approaches would still require that the potentially malicious packets reach the end point and would thus not protect the air interface 5 in the case where the wireless terminal 6 is the end point.

The SYN Relay approach (Check Point NG VPN-1/FireWall-1; Jim Noble et al., Syngress Publishing Inc., 2003) may partly solve the problem since in this method the firewall 3 responds to all SYN packets on behalf of the server by sending the SYN/ACK to the client. Once the ACK is received from the client, the firewall 3 passes the connection to the server. Using this method, it is assumed that the server never receives invalid connection attempts because the firewall 3 does not pass on the original SYN packet until it has received the corresponding ACK from the client. While this technique may offer protection for the server (terminal 6 in this case), which would include protection for the air interface 5, the firewall 3 needs to function as a relay between the server and the client. This imposes a significant overhead at the firewall 3 and, most importantly, it breaks the end-to-end property of the connection since the TCP connection from the client 1 stops first at the firewall 3, which then recreates another TCP connection to the server. One result of this approach is that the TCP sequence numbers at the terminal 6 and at the firewall 3 will differ, resulting in an inability to use IPsec. This approach would also create difficulties if the TCP connection needs to be secured by other means, including Transport Layer Security (TLS).

It would therefore be desirable to provide techniques that address these security concerns.

SUMMARY

The foregoing and other problems are overcome, and other advantages are realized, in accordance with the non-limiting and exemplary embodiments of these teachings. In particular, the exemplary embodiments of the invention provides techniques that enable the formation of a secure connection between a server node and a client node, as overseen and initially enabled by a firewall interposed between the two nodes.

In an exemplary embodiment of the invention, there is provided a method for operating a firewall, a firewall, a computer program product for operating a firewall and a wireless network for operating a firewall. The operation of the firewall includes, in response to receiving a TCP SYN request packet that is sent towards a first node from a second node, said TCP SYN request packet comprising a sequence value ("seq"), sending to the second node a SYN|ACK packet, said SYN|ACK packet comprising a seq and an ack_sequence value ("ack_seq"), where ack_seq of the SYN|ACK packet is not equal to the TCP SYN request packet's seq+1; and in response to receiving a TCP RST packet from the second node, verifying that the seq in the TCP RST packet matches the ack_seq of the SYN|ACK packet and, if it does, designating the connection with the second node as an authorized connection.

In an additional exemplary embodiment of the invention, there is provided a method for operating a firewall, a firewall, a computer program product for operating a firewall and a wireless network for operating a firewall. The operation of the firewall includes in response to receiving a TCP SYN request packet that is sent towards a first node from a second node, said TCP SYN request packet comprising a sequence value ("seq"), sending to the second node a SYN|ACK packet, said SYN|ACK packet comprising a seq and an ack_sequence value ("ack_seq"), where ack_seq is determined by a function that utilizes a secret value known to the firewall, concatenations of IP addresses, and a HASH function.

In another exemplary embodiment of the invention, there is provided a method for operating a firewall, a firewall, a computer program product for operating a firewall and a wireless network for operating a firewall. The operation of the firewall includes in response to receiving a TCP SYN request packet that is sent towards a first node from a second node, said TCP SYN request packet comprising a sequence value ("seq"), sending to the second node a SYN|ACK packet, said SYN|ACK packet comprising a seq and an ack_sequence value ("ack_seq"), where ack_seq is determined by: ack_seq=make32(HASH(LK|IP|TCP)), where LK is a secret known to the firewall, IP refers to a result of a concatenation of source IP address and destination IP address found in the SYN packet, TCP refers to a result of a concatenation of TCP port numbers, and the function make32 takes the string produced by the HASH function and generates a 32-bit number; and in response to receiving a TCP RST packet from the second node, verifying that the seq in the TCP RST packet matches the ack_seq of the SYN|ACK packet and, if it does, designating the connection with the second node as an authorized connection.

In a further exemplary embodiment of the invention, there is provided a method for operating a firewall, a firewall, a computer program product for operating a firewall and a wireless network for operating a firewall. The operation of the firewall includes in response to receiving a TCP SYN request packet that is sent towards a first node from a second node, said TCP SYN request packet comprising a sequence value ("seq"), sending to the second node a SYN|ACK packet, said SYN|ACK packet comprising a seq and an ack_sequence value ("ack_seq"), where ack_seq of the SYN|ACK packet is not equal to the TCP SYN request packet's seq+1; in response to receiving a TCP SYN request packet, sending an additional TCP packet to the second node, where the additional TCP packet does not have a SYN or ACK flag but does comprise a sequence value ("seq") equal to the seq of the TCP SYN request packet; in response to receiving a TCP RST packet from the second node, verifying that the seq in the TCP RST packet matches the ack_seq of the SYN|ACK packet and, if it does, designating the connection with the second node as an authorized connection; after designating the connection with the second node as an authorized connection, using the seq of an additional received TCP RST packet to construct a SYN packet similar to the original TCP SYN request packet; and sending the constructed SYN packet to the first node to further enable a secure connection.

In another exemplary embodiment of the invention, there is provided a wireless network enabled to transfer packet data between a wireless node and a data communication network. The wireless network includes a wireless network security component. Said wireless network security component includes means responsive to receiving a TCP SYN request packet that is sent towards a wireless node from a data communication network, said TCP SYN request packet comprising a sequence value ("seq"), for sending to the second node a SYN|ACK packet, said SYN|ACK packet comprising a seq and an ack_sequence value ("ack_seq"), where ack_seq of the SYN|ACK packet is not equal to the TCP SYN request packet's seq+1; and means responsive to receiving a TCP RST packet from the data communication network, for verifying that the seq in the TCP RST packet matches the ack_seq of the SYN|ACK packet and, if it does, designating the connection with the data communication network as an authorized connection.

In a further exemplary embodiment of the invention, there is provided a wireless network enabled to transfer packet data between a wireless node and a data communication network.

The wireless network includes a wireless network security component. Said wireless network security component includes means responsive to receiving a TCP SYN request packet that is sent towards a data communication network from a wireless node, said TCP SYN request packet comprising a sequence value ("seq"), for sending to the second node a SYN|ACK packet, said SYN|ACK packet comprising a seq and an ack_sequence value ("ack_seq"), where ack_seq of the SYN|ACK packet is not equal to the TCP SYN request packet's seq+1; and means responsive to receiving a TCP RST packet from the wireless node, for verifying that the seq in the TCP RST packet matches the ack_seq of the SYN|ACK packet and, if it does, designating the connection with the wireless node as an authorized connection.

In another exemplary embodiment of the invention, there is provided a method for operating a firewall, a firewall and a computer program product for operating a firewall. The operation of the firewall includes determining that a trigger condition is met, and in response, switching from a Stateful mode to a Stateless mode.

In a further exemplary embodiment of the invention, there is provided a method for operating a firewall, a firewall and a computer program product for operating a firewall. The operation of the firewall includes determining that a trigger condition is met, and switching from a Stateful mode to a Stateless mode when the trigger condition is met, where the trigger condition includes memory consumption resulting from connection attempts equaling a threshold value.

In a further exemplary embodiment of the invention, there is provided a method for operating a firewall, a firewall and a computer program product for operating a firewall. The operation of the firewall includes switching from a Stateful mode to a Stateless mode when a trigger condition is met, wherein the Stateful mode includes: in response to receiving a TCP SYN request packet that is sent towards a first node from a second node, said TCP SYN request packet comprising a sequence value ("seq"), sending to the second node a SYN|ACK packet, said SYN|ACK packet comprising a seq and an ack_sequence value ("ack_seq"), where ack_seq of the SYN|ACK packet is not equal to the TCP SYN request packet's seq+1; and in response to receiving a TCP RST packet from the second node, verifying that the seq in the TCP RST packet matches the ack_seq of the SYN|ACK packet and, if it does, designating the connection with the second node as an authorized connection.

In another exemplary embodiment of the invention, there is provided a method for operating a firewall, a firewall and a computer program product for operating a firewall. The operation of the firewall includes switching from a Stateful mode to a Stateless mode when a trigger condition is met, wherein the Stateless mode includes: in response to receiving a TCP SYN request packet that is sent towards a first node from a second node, said TCP SYN request packet comprising a sequence value ("seq"), sending to the second node a SYN|ACK packet, said SYN|ACK packet comprising a seq and an ack_sequence value ("ack_seq"), where ack_seq of the SYN|ACK packet is not equal to the TCP SYN request packet's seq+1; in response to receiving the TCP SYN request packet, sending an additional TCP packet to the second node, where the additional TCP packet does not have a SYN or ACK flag but does comprise a sequence value ("seq") equal to the seq of the TCP SYN request packet; in response to receiving a TCP RST packet from the second node, verifying that the seq in the TCP RST packet matches the ack_seq of the SYN|ACK packet and, if it does, designating the connection with the second node as an authorized connection; after designating the connection with the second node as an authorized connection, using the seq of an additional received TCP RST packet to construct a SYN packet similar to the original TCP SYN request packet; and sending the constructed SYN packet to the first node to further enable a secure connection.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

As will be made apparent below, the embodiments of this invention address the problems that were discussed above, and define methods, apparatus and a computer program product to reduce malicious incoming traffic, and to drop the incoming malicious traffic at the network, thus conserving valuable air interface while protecting both the network operator and the subscriber to, or the user of, the network. While the embodiments of this invention may relate most particularly to 3GPP2 standards, these embodiments are not restricted to cdma2000 networks, and are generally applicable to other types of networks.

The embodiments of this invention provide methods, apparatus and a computer program product to reduce an occurrence of attacks that reach wireless terminals, and focus particularly on TCP. The embodiments of this invention beneficially reduce occurrences of DoS attacks, such as those that use TCP SYN with a forged source IP address.

The term "firewall" is considered herein to be a hardware or software entity intended to enforce security policies. Generally, and as a non-limiting example, a firewall is deployed between a trusted, protected private network and an untrusted public network to protect the private network from unauthorized access, malicious tampering and attacks.

Figure 1A:
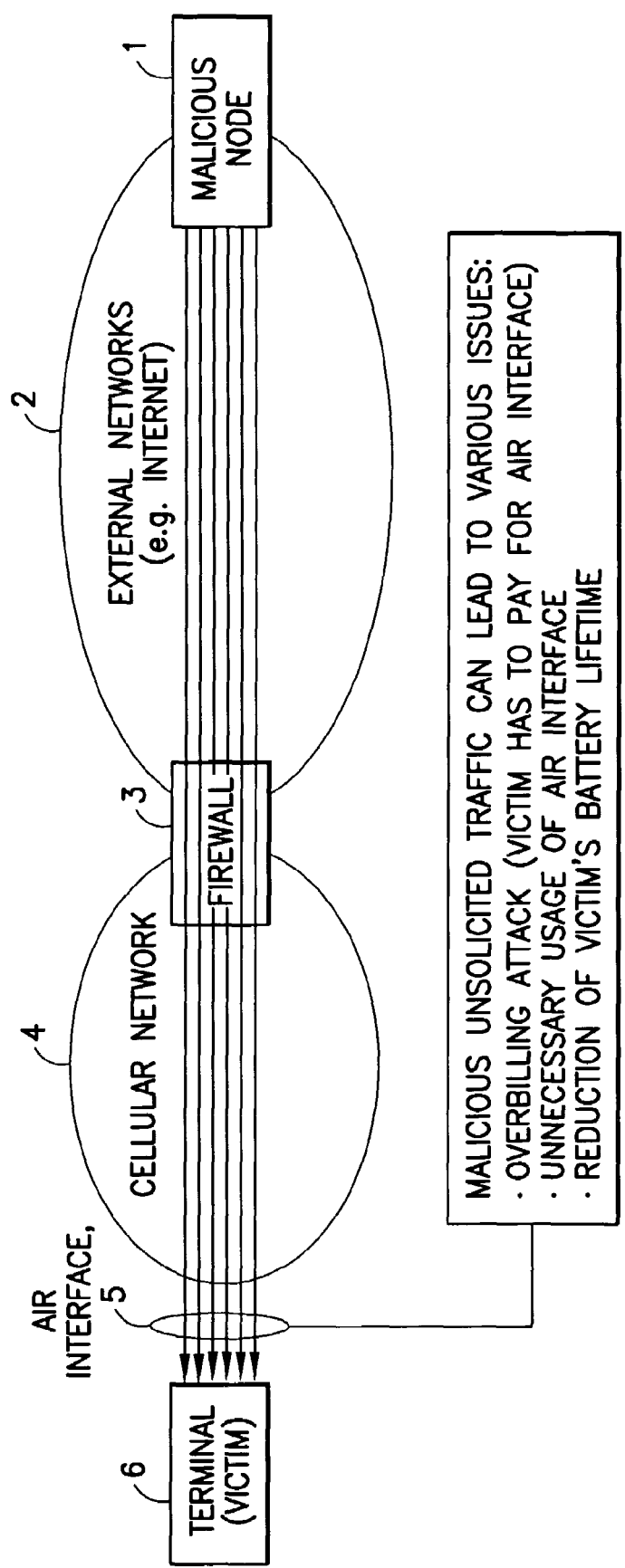
FIG. 1A depicts a malicious node sending malicious traffic to a wireless terminal via external networks, a firewall, a cellular network and the air interface of the cellular network, and is illustrative of the problem addressed by the exemplary embodiments of this invention.
Figure 1B:
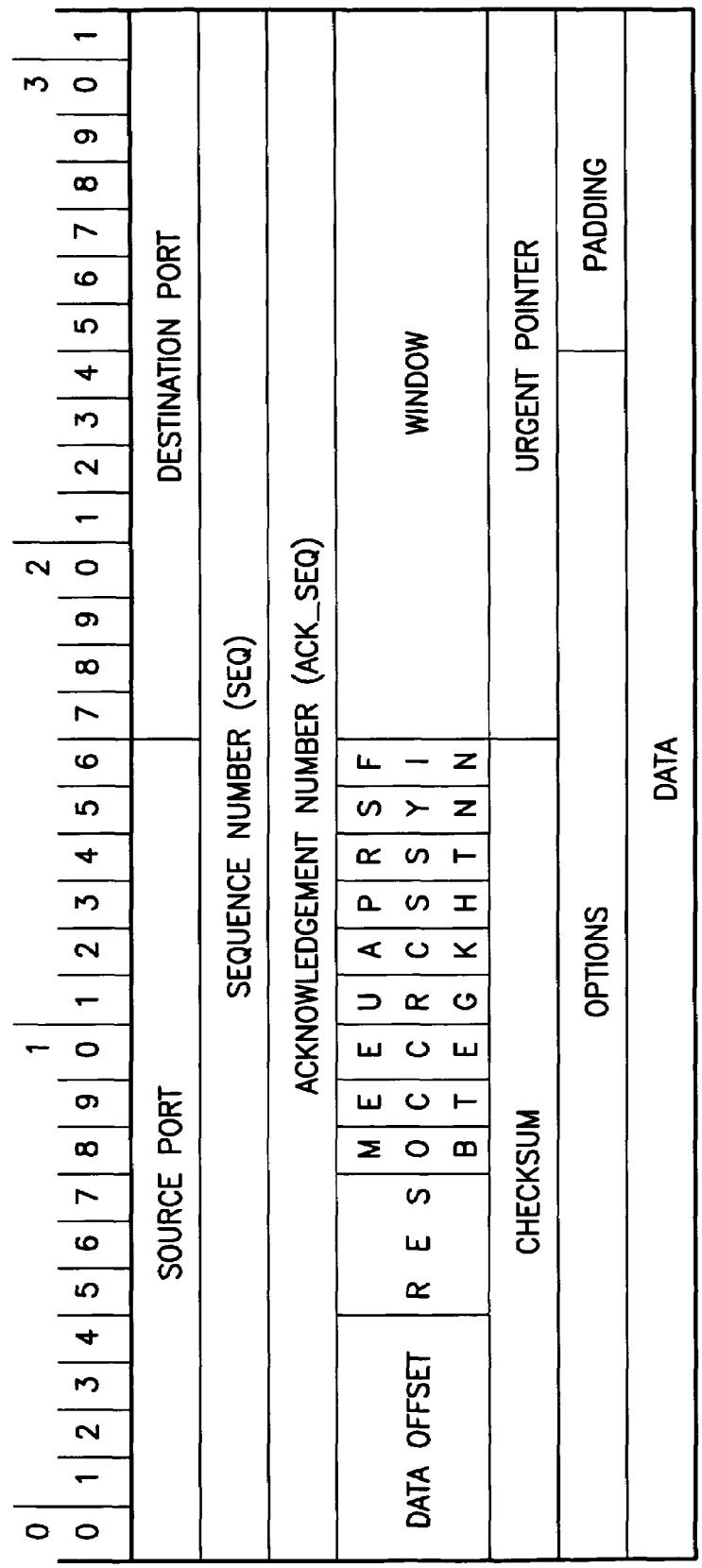
FIG. 1B shows a conventional TCP Header Format.

FIG. 1B shows the conventional TCP Header Format (see RFC793, Transmission Control Protocol, DARPA Internet Program, Protocol Specification, September 1981).

Figure 2:
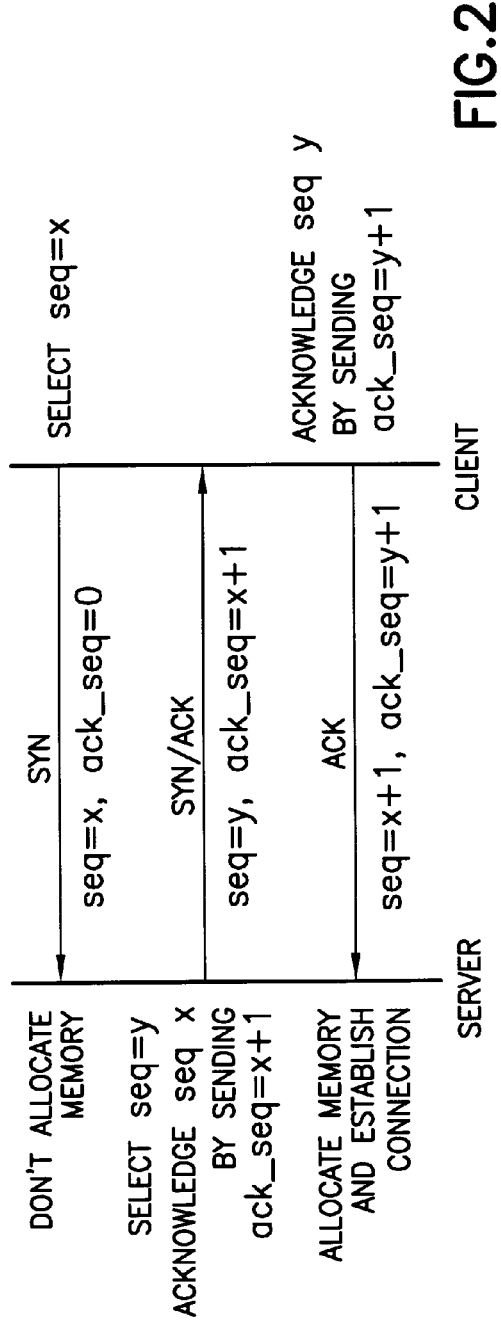
FIG. 2 is a message sequence diagram showing a TCP Connection Setup.

In a traditional wire line case, TCP servers use the SYN Cookie mechanism to protect against CPU and memory exhaustion attacks. As is shown in FIG. 2, a TCP connection takes place between a server and a client using the exchange of SYN, SYN|ACK and ACK packets (i.e., for the TCP packet header format described in FIG. 1B, the SYN, SYN|ACK, and ACK bits are set accordingly). In the SYN packet, the TCP client selects a random sequence number, X, and expects the server to acknowledge X by adding one to it. When the server receives the SYN packet with sequence number X, it adds one to it, and places the result in the ack_seq field of the TCP packet. Furthermore, the TCP server selects its own sequence number, Y, and sends the resulting SYN|ACK packet to the client. On receiving the SYN|ACK, the client first verifies that the ack_seq of the packet is X+1. If it is, then the client acknowledges the SYN|ACK packet by sending Y+1 in the ack_seq number of the ACK packet. If the ack_seq received by the client is not X+1, then the client sends an RST message back to the server. The RST (reset) bit being set in the TCP header indicates that the receiver should delete the connection without further interaction.

In the traditional wire line case, in order to protect against CPU and memory exhaustion attacks a TCP sender does not allocate all the required memory space on receiving the SYN packet. Since the server does not know if the SYN packet arrived from a valid node or from a malicious node, it waits until receiving the ACK of its SYN|ACK before allocating memory. Since the ACK of the SYN|ACK can only be generated by a valid client (or a node on the path to the valid client), it guarantees that blind SYN flooding attacks will not impact the TCP server.

Although SYN Cookies work well against CPU and memory exhaustion attacks, they cannot protect against battery power, overbilling, or bandwidth exhaustion attacks. To protect against these attacks, the mobile terminal functioning as a server must be protected before the attack packets are sent over the air interface. One way to do this is to use a server firewall.

Figure 3:
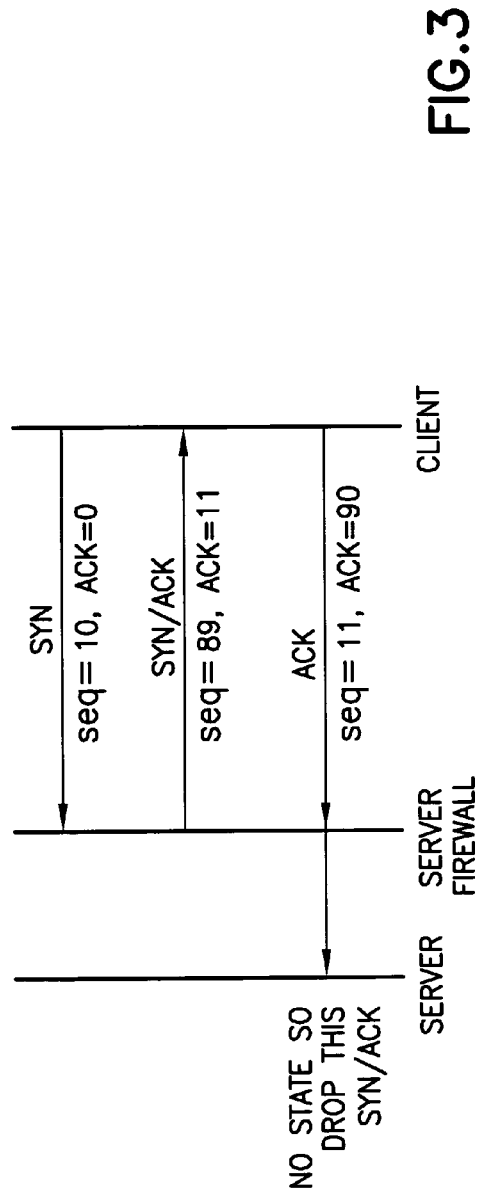
FIG. 3 is a message sequence diagram that illustrates why a SYN cookie cannot be used with a server firewall.

For a firewall in the network to protect the TCP server (i.e. the terminal 6 of FIG. 1A), it verifies that the client that sends a SYN request does indeed exist. However, unlike the wire line case where the server sends a SYN Cookie, the firewall cannot send a SYN Cookie since the firewall does not know what sequence number Y the server will use. For example, in FIG. 3 one may assume that the firewall selects a sequence number 89 on behalf of the TCP server. When the client acknowledges this sequence number, the firewall will allow the packet to go through. However, the server does not know that the firewall assigned the sequence number 89 on its behalf. Although designing a protocol between the server firewall and the server itself may resolve this problem, such an approach would require changes to the TCP stack and a new protocol to be defined between the server and firewall, both of which are undesirable. The presently preferred embodiments of this invention thus use a different approach that avoids these and other problems.

Figure 4:
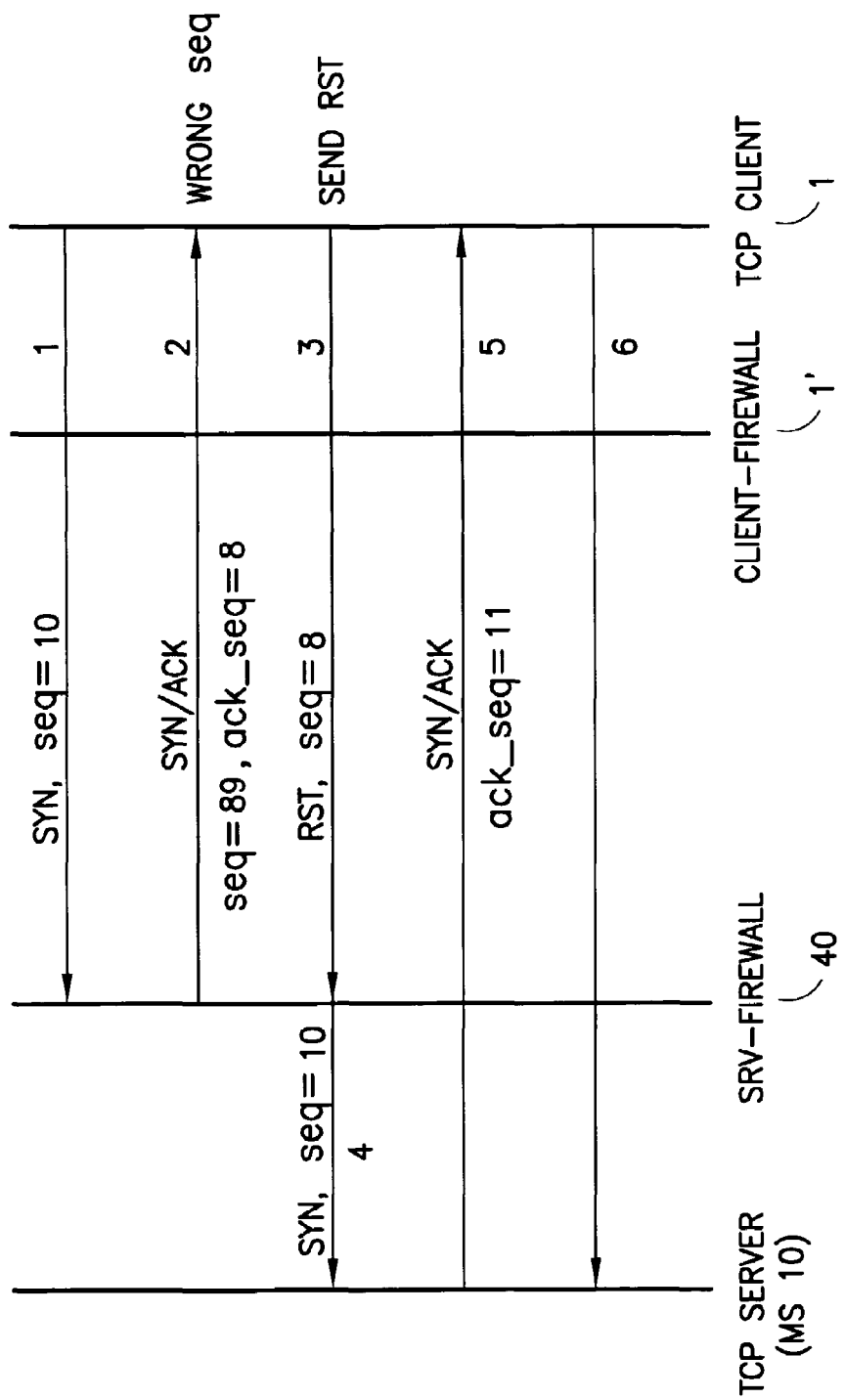
FIG. 4 is a message sequence diagram that illustrates a Stateful embodiment of this invention to solicit an RST from a client.

To address the foregoing problem, rather than acknowledging the SYN packet with the correct sequence number, X+1, the firewall instead acknowledges the SYN request with an invalid sequence number. Referring to FIG. 4, when a firewall 40 operating in accordance with exemplary embodiments of this invention sends the invalid SYN|ACK, the TCP client node 1 responds with a reset message RST instead of an acknowledgment message ACK. Since only a valid client 1 can generate this RST message with the correct sequence numbers in the RST message, the presence of the RST message with the correct sequence numbers guarantees that the client 1 is real (valid). Because the TCP server (e.g., MS 10, see FIG. 7) does not need to know about the RST message and the incorrect sequence number, the connection can proceed normally once the firewall 40 has verified that the client 1 is valid. Note that these exchanges can occur transparently through a client firewall 1', if present.

For example, in FIG. 4, upon receiving the SYN packet, the firewall 40 sends a SYN|ACK, but instead of incrementing the sequence number by 1 and sending a valid SYN|ACK with ack=10+1=11, it sends an incorrect ACK sequence number. Since the client was expecting an ACK sequence number of e.g., 11, but receives an ACK sequence of, e.g., 8, it responds with a RST message whose sequence number is 8. When the firewall 40 receives the RST message it verifies that the sequence number in the RST message is actually 8. If it is, then the firewall recreates the SYN to go to the server 10. From that point onwards, the connection can proceed normally.

One aspect of this approach is that the firewall 40 maintains a minimum of 40 bytes of state for each SYN request. However, in the case of a massive SYN flooding attack, an attacker may target the firewall 40 itself in an attempt to cause memory exhaustion at the firewall 40.

Figure 5:
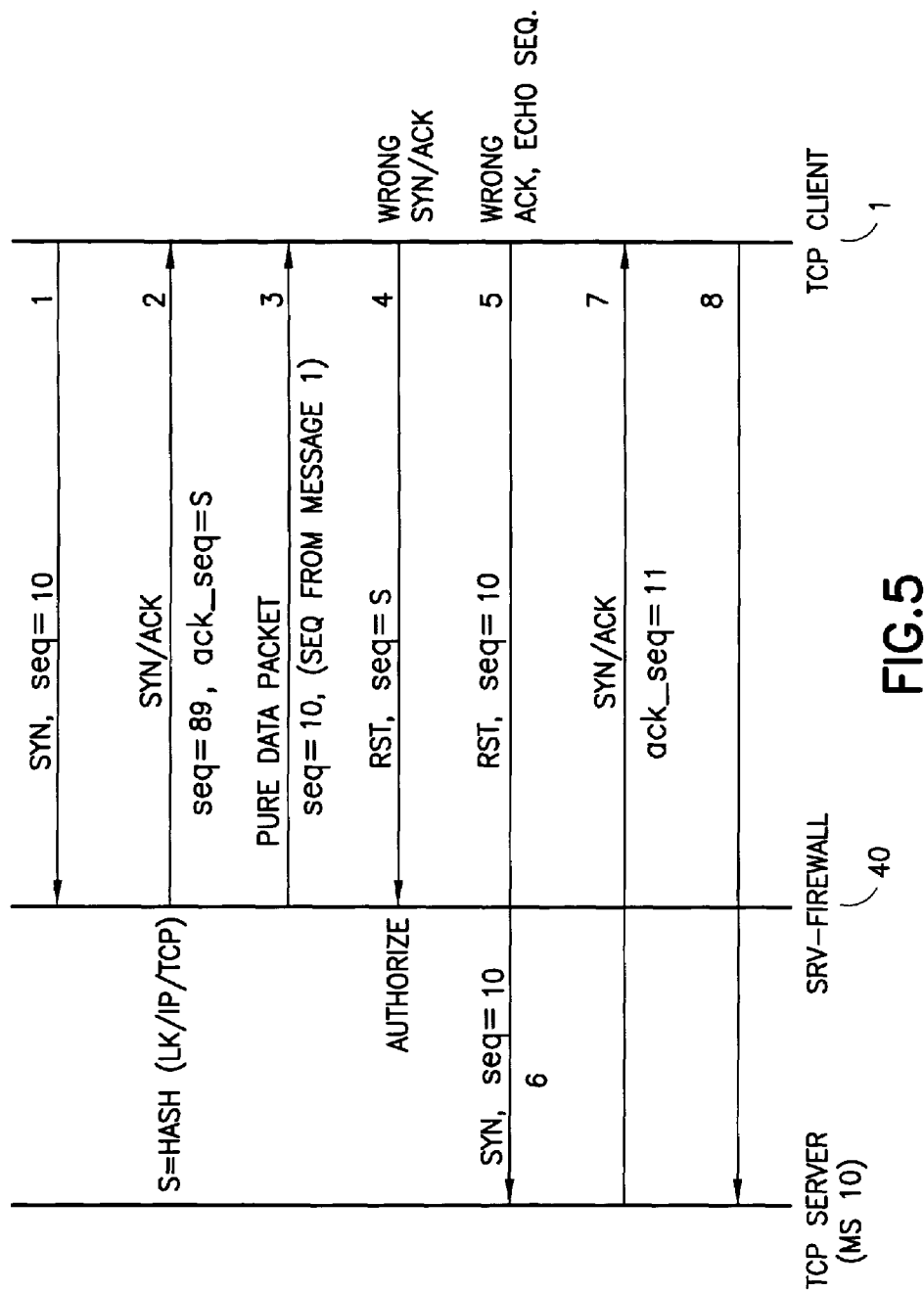
FIG. 5 is a message sequence diagram that illustrates a Stateless embodiment of this invention to solicit an RST from a client.

FIG. 5 describes a Stateless embodiment of this invention, as opposed to the Stateful embodiment of FIG. 4. In the Stateless embodiment, the firewall 40 does not need to maintain any state until the client responds with a valid RST message. To achieve this, the firewall 40 maintains a long-term secret that is not known to anyone, except the firewall 40. For example, refer to the secret as LK. When the firewall 40 receives the SYN request, it sends two packets. First, a SYN|ACK where the ack_sequence number of the packet is computed as:

$$ack\_seq = make32(HASH(LK|IP|TCP)), \quad (1)$$

where IP refers to the result of the concatenation of source IP address and destination IP address found in the SYN packet, and TCP refers to the 32 bit result of the concatenation of the TCP port numbers. Make32 is a generic function that yields a 32-bit number for the string generated by the HASH function. In the simplest case, make32 could output the first 32 bits of the HASH function, but in other, more preferred, cases the make32 output may be obtained from a 32-bit pseudo random number generator, whose seed is the result of the HASH function. In general, the firewall 40 may use any of a number of possible implementations of the make32 function.

Once the firewall 40 has generated the ack_seq number, it sends a SYN|ACK packet to the client 1 to ensure that the client is valid and does indeed exist. When the client 1 receives this SYN|ACK, it responds with an RST packet whose sequence number is the same as the ack_seq number that was generated in equation (1), as per RFC793. When this RST packet from the client is received by the firewall, a verification is made that the sequence number in the RST packet matches. If it does, then the connection is designated as authorized. Unlike the Stateful embodiment of FIG. 4 where the firewall 40 would construct the SYN and send it to the server 10, the firewall 40 does not have knowledge of the sequence number of the connection (as no state is saved). To obtain the correct sequence number, the firewall 40 sends another TCP packet (without the SYN flag or the ACK flags, i.e., a pure data packet) whose sequence number is the same as the sequence number of the incoming SYN packet. As is defined in RFC793, a TCP client on receiving a pure data packet when the connection is not established sends a RST packet whose sequence number is the same as the sequence number of the incoming packet (if the amount of data in the packet is zero). The sending of the pure data packet by the firewall 40 thus achieves an echo-back effect. The firewall 40, after authorization, uses the sequence number from the echoed-back RST message to construct the SYN packet and send it to the server.

It should be noted that in the event a RST message is lost in the network, the TCP client will retransmit the original SYN. If the firewall 40 has authenticated a connection (i.e., the source addresses and IP addresses), it may allow the retransmitted SYN packet to pass through.

It is preferred that the firewall 40 use the Stateless approach or mode of FIG. 5 when the memory consumption for unauthenticated TCP connections rises above some fixed or variable threshold. Note that the threshold may be set such that if a memory exhaustion attack is under way and the amount of memory used to save SYN request states reaches some predetermined amount, then the firewall 40 may adapt by switching from using the Stateful embodiment of FIG. 4 to the Stateless embodiment of FIG. 5.

It should be noted that the server (e.g., the wireless terminal) need not have any knowledge that the firewall 40 has protected it from a possible DoS attack.

Figure 6:
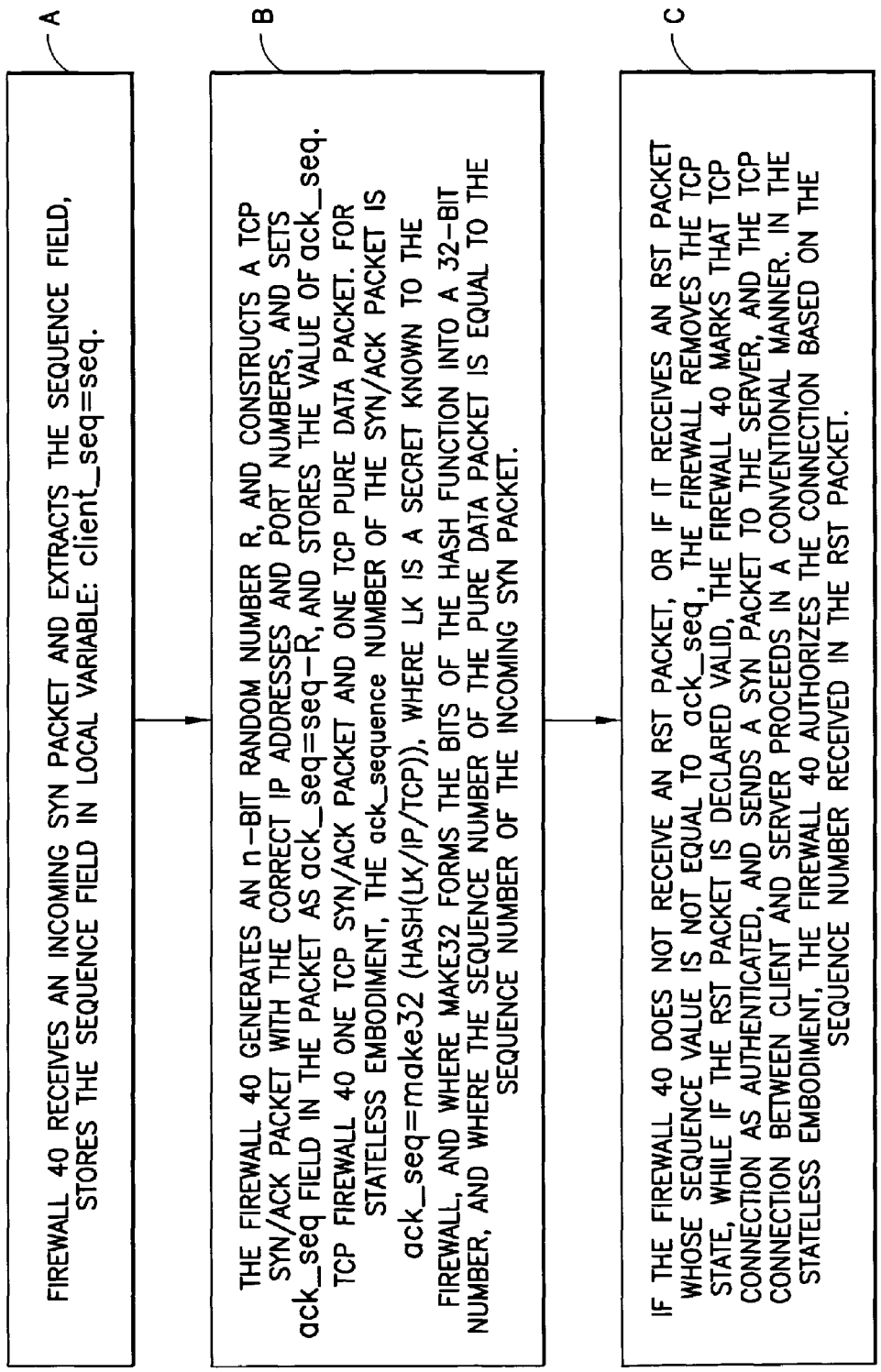
FIG. 6 is a logic flow diagram in accordance with exemplary embodiments of this invention.

A presently preferred procedure for implementing the foregoing embodiments of this invention is now described in further detail. Reference is also made to the logic flow diagram of FIG. 6.

A. When the firewall 40 receives the SYN message it extracts the sequence field from the SYN packet, and stores it in a local variable: client_seq=seq. The firewall 40 preferably also stores the received SYN TCP packet for further use.

B. The firewall 40 generates an n-bit (e.g., a 16-bit) random number R, and constructs a TCP SYN|ACK packet with the correct IP addresses and Port numbers. The firewall 40 sets the ack_seq field in the packet as ack_seq=seq-R. In addition to the TCP packet stored in step A, the firewall 40 also stores the value of ack_seq so that it can subsequently verify the incoming RST packet.

In the Stateless mode (FIG. 5), the TCP firewall 40 preferably does not save any state (e.g., the sequence number and the SYN TCP packet), but instead sends one TCP SYN|ACK packet and one TCP data packet. The ack_sequence number of the SYN|ACK packet is preferably generated as described above, while the sequence number of the data packet is preferably the same as the sequence number of the incoming SYN packet.

C. If the firewall 40 does not receive an RST packet, or if it receives an RST packet whose sequence value is not equal to ack_seq in step B, it removes the TCP state from the firewall 40. Note that as pointed out by J. Postel, "Transmission Control Protocol Functional Specification," RFC793. URL:http://www.ietf.org/rfc/rfc0793.txt, at page 36, a valid TCP client with a state for the TCP connection will respond by sending a RST whose seq number is the same as the ack_seq number of SYN|ACK packet. However, in that the firewall 40 generates the ack_seq number randomly, an attacker cannot predict the correct seq number in the RST packet. Also note that the TCP client does not close its connection because of the incorrect sequence number in SYN|ACK (see RFC793 for a detailed discussion of this procedure).

If the RST packet is declared valid, the firewall 40 marks that TCP connection as authenticated, and sends a SYN packet to the server. Thereafter, the TCP connection may proceed in a conventional manner.

In the Stateless approach or mode, the firewall 40 preferably authorizes the connection based on the sequence number received in the RST packet (i.e., if the firewall 40 receives a RST packet sequence number that is equal to the one calculated in accordance with Equation 1 above). Until the connection is authenticated, the firewall 40 preferably does not forward any TCP packets to the server (wireless terminal 10). Once the connection is authenticated, and if the connection receives an RST message, the firewall 40 preferably constructs a TCP SYN packet with the sequence number in the RST message and sends the TCP SYN packet to the TCP server. If the authenticated connection does not receive the RST message, but instead receives a SYN packet (for example, if the client timed out and retransmitted it), it is preferred to let the SYN packet pass through the firewall 40.

In general, it can be noted that the Stateless case (FIG. 5) trades off memory consumption in the firewall 40 with a delayed connection establishment between the client and server nodes.

The embodiments of this invention can be implemented in the firewall 40 as described above, or in another network entity (e.g., in a Packet Data Serving Node 28, as described below in reference to FIG. 7). For the purposes of this invention, the firewall 40 may be considered to be any network node interposed between the wireless terminal server 10 and the client node 1, and may further be assumed to include at least one data processor that operates under control of a computer program that is stored on or in a computer-readable medium, such as a disk, a tape and/or a semiconductor memory, so as to implement either or both of the Stateful (FIG. 4) or Stateless (FIG. 5) embodiments of this invention, and variations thereof.

Figure 7:
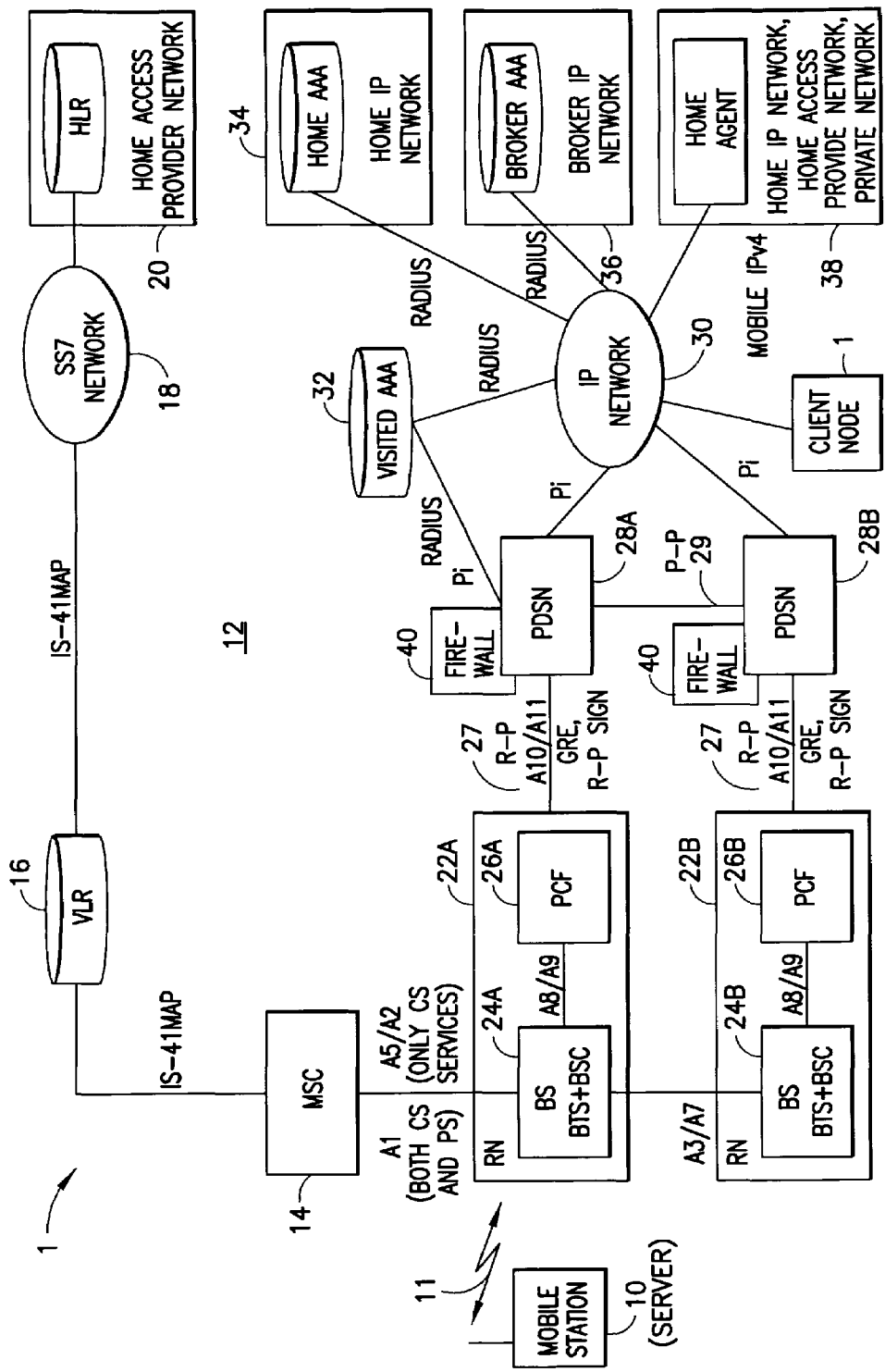
FIG. 7 illustrates a CDMA network that is one suitable environment in which to implement the teachings of this invention.

Further in this regard, reference may be had to FIG. 7 for showing a simplified block diagram of a wireless communication system, specifically a CDMA 2000 1× network, that is suitable for use in practicing the teachings of this invention. A description of FIG. 7 is provided in order to place the embodiments of this invention into a suitable technological context. However, it should be appreciated that the specific network architecture and topology shown in FIG. 7 is not to be construed in a limiting sense upon the embodiments of this invention, as the embodiments of this invention may be practiced in networks having an architecture and topology that differs from that shown in FIG. 7. Furthermore, the general concepts of this invention may be practiced as well in TDMA-based and other mobile TCP/IP networks, and are thus not limited for use only in a CDMA network. Both GSM and wideband CDMA (WCDMA) networks may benefit from using embodiments of this invention.

In general, the embodiments of this invention find utility in wireless technologies where the wireless terminal 6, referred to as the MS 10 in FIG. 7, functions at least in part as a server for at least one node that functions as the client 1. As such, while reading the ensuing description it should be noted that while some aspects of the description are specific to a CDMA network, the description of FIG. 7 is not intended to be read in a limiting sense upon the implementation, use and/or practice of this invention.

The wireless communication system shown in FIG. 7 includes at least one MS 10. The MS 10 may be or may include a cellular telephone, or any type of mobile terminal (MT) or mobile node (MN) having wireless communication capabilities including, but not limited to, portable computers, personal data assistants (PDAs), Internet appliances, gaming devices, imaging devices and devices having a combination of these and/or other functionalities. The MS 10 is assumed to be compatible with the physical and higher layer signal formats and protocols used by a network 12, and to be capable of being coupled with the network 12 via a wireless link 11 that comprises the air interface. In the presently preferred embodiments of this invention the wireless link 11 is a radio frequency (RF) link, although in other embodiments the wireless link 11 could be an optical link.

In a conventional sense the network 12 includes a mobile switching center (MSC) 14 coupled through an IS-41 Map interface to a visitor location register (VLR) 16. The VLR 16 in turn is coupled through an IS-41 Map interface to a switching system seven (SS-7) network 18 and thence to a home location register (HLR) 20 that is associated with a home access provider network of the MS 10. The MSC 14 is also coupled through an A1 interface (for circuit switched (CS) and packet switched (PS) traffic) and through an A5/A2 interface (CS services only) to a first radio network (RN) 22A. The first RN 22A includes a base station (BS) 24A that includes a base transceiver station (BTS) and a base station center (BSC) that is coupled through an A8/A9 interface to a Packet Control Function (PCF) 26A. The PCF 26A is coupled via an R-P (PDSN/PCF) interface 27 (also called an A10/A11 interface) to a first packet data serving node (PDSN) 28A and thence to an IP network 30 (via a Pi interface). The PDSN 28A is also shown coupled to a visited access, authorization and accounting (AAA) node 32 via a Pi and a remote authentication dial-in service (RADIUS) interface, that in turn is coupled to the IP network 30 via a RADIUS interface. Also shown coupled to the IP network 30 via RADIUS interfaces are a Home IP network AAA node 34 and a Broker IP network AAA node 36. A home IP network/home access provider network/private network Home Agent 38 is coupled to the IP network via a Mobile IPv4 interface. In accordance with RFC3220, the Home Agent 38 is a router on the home network of a mobile node (the MS 10 in this description) that tunnels datagrams for delivery to the mobile node when it is away from home, and that maintains current location information for the mobile node. (See RFC3220, C. Perkins (Ed.), "IP Mobility Support for IPv4", Network Working Group, January 2002.)

Also shown in FIG. 7 is a second RN 22B that is coupled to the first RN 22A via an A3/A7 interface. The second RN 22A includes a BS 24B and a PCF 26B and is coupled to a second PDSN 28B. The PDSN 28A and the PDSN 28B are coupled together through a P-P interface 29 (PDSN to PDSN interface, defined in IS835C).

As was noted above, the firewall 40 functionality in accordance with this invention (FIGS. 4 and/or 5) may be incorporated into the PDSN 28, or into another network node that is located before the wireless link (air interface) 11, such as the PCF 26, where the TCP packets of interest are present. In other types of wireless systems, packet handling nodes of equivalent functionality can be used.

Although presented in the context of a wireless system, as in FIG. 7, exemplary embodiments of the invention may also be implemented in wired systems.

Those skilled in the art will appreciate that one or more of the devices shown in FIG. 7 will include one or more data processors and one or more memories. Exemplary embodiments of the invention may be implemented with one or more suitably programmed processors.

The firewall functionality may be located anywhere in the network system. As a non-limiting example, the firewall functionality may be located in the MS 10 node. For example, the firewall functionality may be interposed between a TCP/IP layer and an application layer that functions in the manner of a server.

A number of advantages may be realized from using exemplary embodiments of this invention. These advantages include, but need not be limited to, the following:

(a) the use of embodiments of this invention preserves the end-to-end nature of TCP;

(b) the use of embodiments of this invention does not require any cooperation between the TCP server and the firewall 40, and can operate transparently without the knowledge of the TCP server;

I the use of embodiments of this invention does not require that any modifications be made to any existing protocols (e.g. TCP, IP); and (d) the use of embodiments of this invention does not require that any modification be made to the client or to the server.

It should further be noted that the use of embodiments of this invention delays the connection setup by one round trip, i.e., the messaging round trip taken to verify that the client can generate a correct RST message.

It should also be noted that in the case where the client firewall 40 blocks an incoming SYN|ACK with a wrong sequence number, it is preferred to employ the firewall management interface to allow incorrect sequence numbers to pass through. Furthermore, the client firewall 40 may respond with a RST message on behalf of the client if it is not desired that wrong sequence numbers pass through the firewall 40.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but one example, the use of other similar or equivalent messaging formats may be attempted by those skilled in the art. As another example, it should be noted that the pure data packet (message 3 in FIG. 5) could be sent after the receipt of the first RST packet (message 4 in FIG. 5), but in this case the firewall 40 will need to store the SYN packet for a longer time, which could interfere with achieving the (substantially) stateless goal. Thus, the packet order shown at least in FIG. 5 is presently preferred, but should not be viewed as a limitation upon the practice of the embodiments of this invention. All such and similar modifications of the teachings of this invention will still fall within the scope of the embodiments of this invention.

In general, the use of the embodiments of this invention may be beneficial in any network topology where a server can be reached by a malicious attacker through a bandwidth limited communications channel, where it is desirable to conserve the channel bandwidth for legitimate uses.

Furthermore, some of the features of the preferred embodiments of this invention may be used to advantage without the corresponding use of other features. As such, the foregoing description should be considered as merely illustrative of the principles, teachings and embodiments of this invention, and not in limitation thereof.

What is claimed is:

1. A method comprising:
in response to a firewall receiving a transport control protocol synchronization (TCP SYN) request packet that is sent towards a first node from a second node, said TCP SYN request packet comprising a sequence value ("seq"), sending to the second node an acknowledgement and synchronization (SYN|ACK) packet, said SYN|ACK packet comprising a seq and an ack_sequence value ("ack_seq"), where ack_seq of the SYN|ACK packet is not equal to the TCP SYN request packet's seq+1, wherein the ack_seq of the SYN|ACK packet is determined by a function that utilizes a secret value known to the firewall, IP address information, and a HASH function, wherein the secret value is not known to the second node;

in response to receiving a transport control protocol reset (TCP RST) packet from the second node, verifying that the seq in the TCP RST packet matches the ack_seq of the SYN|ACK packet and, if it does, designating the connection with the second node as an authorized connection;

sending an additional transport control protocol (TCP) packet to the second node, where the additional TCP packet does not have a SYN or ACK flag but does comprise a sequence value ("seq") equal to the seq of the TCP SYN request packet;

after designating the connection with the second node as an authorized connection, using the seq of an additional received TCP RST packet to construct a synchronization (SYN) packet similar to the original TCP SYN request packet; and sending the constructed SYN packet to the first node to further enable a secure connection.

2. The method of claim 1, wherein the ack_seq of the SYN|ACK packet is determined by:

$$ack\_seq=make32(HASH(LK|IP|TCP)),$$

where LK is the secret value, IP refers to a result of a concatenation of source IP address and destination IP address found in the SYN packet, TCP refers to a result of a concatenation of TCP port numbers, and the function make32 takes the string produced by the HASH function and generates a 32-bit number.

3. The method of claim 1, wherein the ack_seq of the SYN|ACK packet is computed as:

$$ack\_seq=make32(HASH(LK|IP|TCP)),$$

where LK is the secret value, where IP refers to a result of a concatenation of source IP address and destination IP address found in the SYN packet, TCP refers to a result of a concatenation of TCP port numbers, and where the function make32 takes the bits of the hash functions and forms them into a 32-bit number, and wherein the additional TCP packet comprises a pure data packet.

4. An apparatus comprising:

at least one data processor configured to send, in response to receiving a transport control protocol synchronization (TCP SYN) request packet that is sent towards a first node from a second node, said TCP SYN request packet comprising a sequence value ("seq"), to the second node an acknowledgement and synchronization (SYN|ACK) packet, said SYN|ACK packet comprising a seq and an ack_sequence value ("ack_seq"), where ack_seq of the SYN|ACK packet is not equal to the TCP SYN request packet's seq+1, wherein the ack_seq of the SYN|ACK packet is determined by a function that utilizes a secret value known to the network node, IP address information, and a HASH function, wherein the secret value is not known to the second node; and a computer-readable medium configured to store the secret value, wherein the at least one data processor is further configured:

to verify, in response to receiving a transport control protocol reset (TCP RST) packet from the second node, that the seq in the TCP RST packet matches the ack_seq of the SYN|ACK packet and, if it does, for designating the connection with the second node as an authorized connection;

to send, in response to receiving the TCP SYN request, an additional transport control protocol (TCP) packet to the second node, where the additional TCP packet does not have a SYN or ACK flag but does comprise a sequence value ("seq") equal to the seq of the TCP SYN request packet;

to use, after designating the connection with the second node as an authorized connection, the seq of an additional received TCP RST packet to construct a synchronization (SYN) packet similar to the original TCP SYN request packet; and to send the constructed SYN packet to the first node to further enable a secure connection, wherein the apparatus is configured to operate as a firewall.

5. The apparatus of claim 4, wherein the ack_seq of the SYN|ACK packet is determined by:

$$ack\_seq=make32(HASH(LK|IP|TCP)),$$

where LK is the secret value, IP refers to a result of a concatenation of source IP address and destination IP address found in the SYN packet, TCP refers to a result of a concatenation of TCP port numbers, and the function make32 takes the string produced by the HASH function and generates a 32-bit number.

6. A computer-readable medium storing program instructions for operating a firewall, execution of said program instructions resulting in operations comprising:

in response to receiving a transport control protocol synchronization (TCP SYN) request packet that is sent towards a first node from a second node, said TCP SYN request packet comprising a sequence value ("seq"), sending to the second node an acknowledgement and synchronization (SYN|ACK) packet, said SYN|ACK packet comprising a seq and an ack_sequence value ("ack_seq"), where ack_seq of the SYN|ACK packet is not equal to the TCP SYN request packet's seq+1, wherein the ack_seq of the SYN|ACK packet is determined by a function that utilizes a secret value known to the firewall, IP address information, and a HASH function, wherein the secret value is not known to the second node;

in response to receiving a transport control protocol reset (TCP RST) packet from the second node, verifying that the seq in the TCP RST packet matches the ack_seq of the SYN|ACK packet and, if it does, designating the connection with the second node as an authorized connection;

sending an additional transport control protocol (TCP) packet to the second node, where the additional TCP packet does not have a SYN or ACK flag but does comprise a sequence value ("seq") equal to the seq of the TCP SYN request packet;

after designating the connection with the second node as an authorized connection, using the seq of an additional received TCP RST packet to construct a synchronization (SYN) packet similar to the original TCP SYN request packet; and sending the constructed SYN packet to the first node to further enable a secure connection.

7. The computer-readable medium of claim 6, wherein the ack_seq of the SYN|ACK packet is determined by:

$$ack\_seq=make32(HASH(LK|IP|TCP)),$$

where LK is the secret value, IP refers to a result of a concatenation of source IP address and destination IP address found in the SYN packet, TCP refers to a result of a concatenation of TCP port numbers, and the function make32 takes the string produced by the HASH function and generates a 32-bit number.

8. A method for operating a firewall, comprising:
determining that a trigger condition is met; and
in response to determining that the trigger condition is met, switching from a Stateful mode to a Stateless mode, wherein the Stateless mode comprises:
in response to receiving a transport control protocol synchronization (TCP SYN) request packet that is sent towards a first node from a second node, said TCP SYN request packet comprising a sequence value ("seq"), sending to the second node an acknowledgement and synchronization (SYN|ACK) packet, said SYN|ACK packet comprising a seq and an ack_sequence value ("ack_seq"), where ack_seq of the SYN|ACK packet is not equal to the TCP SYN request packet's seq+1, wherein the ack_seq of the SYN|ACK packet is determined by a function that utilizes a secret value known to the firewall, IP address information, and a HASH function, wherein the secret value is not known to the second node;
in response to receiving the TCP SYN request packet, sending an additional transport control protocol (TCP) packet to the second node, where the additional TCP packet does not have a SYN or ACK flag but does comprise a sequence value ("seq") equal to the seq of the TCP SYN request packet;
in response to receiving a transport control protocol reset (TCP RST) packet from the second node, verifying that the seq in the TCP RST packet matches the ack_seq of the SYN|ACK packet and, if it does, designating the connection with the second node as an authorized connection;
after designating the connection with the second node as an authorized connection, using the seq of an additional received TCP RST packet to construct a synchronization (SYN) packet similar to the original TCP SYN request packet; and
sending the constructed SYN packet to the first node to further enable a secure connection.

9. The method of claim 8, wherein the trigger condition comprises memory consumption resulting from connection attempts equaling a threshold value.

10. The method of claim 8, wherein the Stateful mode comprises:
in response to receiving a transport control protocol synchronization (TCP SYN) request packet that is sent towards a first node from a second node, said TCP SYN request packet comprising a sequence value ("seq"), sending to the second node an acknowledgement and synchronization (SYN|ACK) packet, said SYN|ACK packet comprising a seq and an ack_sequence value ("ack_seq"), where ack_seq of the SYN|ACK packet is not equal to the TCP SYN request packet's seq+1; and
in response to receiving a transport control protocol reset (TCP RST) packet from the second node, verifying that the seq in the TCP RST packet matches the ack_seq of the SYN|ACK packet and, if it does, designating the connection with the second node as an authorized connection.

11. An apparatus comprising at least one data processor and a computer-readable medium, wherein the data processor is configured, responsive to a trigger condition, to switch the apparatus from a Stateful mode to a Stateless mode, wherein the Stateless mode comprises:
the at least one data processor sending, in response to receiving a transport control protocol synchronization (TCP SYN) request packet that is sent towards a first node from a second node, said TCP SYN request packet comprising a sequence value ("seq"), to the second node an acknowledgement and synchronization (SYN|ACK) packet, said SYN|ACK packet comprising a seq and an ack_sequence value ("ack_seq"), where ack_seq of the SYN|ACK packet is not equal to the TCP SYN request packet's seq+1, wherein the ack_seq of the SYN|ACK packet is determined by a function that utilizes a secret value known to the apparatus, IP address information, and a HASH function, wherein the secret value is not known to the second node;
the at least one data processor sending, in response to receiving the TCP SYN request packet, an additional transport control protocol (TCP) packet to the second node, where the additional TCP packet does not have a SYN or ACK flag but does comprise a sequence value ("seq") equal to the seq of the TCP SYN request packet;
the at least one data processor verifying, in response to receiving a transport control protocol reset (TCP RST) packet from the second node, that the seq in the TCP RST packet matches the ack_seq of the SYN|ACK packet and, if it does, for designating the connection with the second node as an authorized connection;
after designating the connection with the second node as an authorized connection, the at least one data processor using the seq of an additional received TCP RST packet to construct a synchronization (SYN) packet similar to the original TCP SYN request packet; and
the at least one data processor sending the constructed SYN packet to the first node to further enable a secure connection,
wherein the computer-readable medium is configured to store the secret value, wherein the apparatus is configured to operate as a firewall.

12. The apparatus of claim 11, wherein the trigger condition comprises memory consumption resulting from connection attempts equaling a threshold value.

13. The apparatus of claim 11, wherein the Stateful mode comprises:
the at least one data processor sending, in response to receiving a transport control protocol synchronization (TCP SYN) request packet that is sent towards a first node from a second node, said TCP SYN request packet comprising a sequence value ("seq"), to the second node an acknowledgement and synchronization (SYN|ACK) packet, said SYN|ACK packet comprising a seq and an ack_sequence value ("ack_seq"), where ack_seq of the SYN|ACK packet is not equal to the TCP SYN request packet's seq+1; and
the at least one data processor verifying, in response to receiving a transport control protocol reset (TCP RST) packet from the second node, that the seq in the TCP RST packet matches the ack_seq of the SYN|ACK packet and, if it does, designating the connection with the second node as an authorized connection.

14. A computer-readable medium storing program instructions for operating a firewall, execution of said program instructions resulting in operations comprising switching from a Stateful mode to a Stateless mode when a trigger condition is met, wherein the Stateless mode comprises:
in response to receiving a transport control protocol synchronization (TCP SYN) request packet that is sent towards a first node from a second node, said TCP SYN request packet comprising a sequence value ("seq"), sending to the second node an acknowledgement and synchronization (SYN|ACK) packet, said SYN|ACK packet comprising a seq and an ack_sequence value ("ack_seq"), where ack_seq of the SYN|ACK packet is not equal to the TCP SYN request packet's seq+1, wherein the ack_seq of the SYN|ACK packet is determined by a function that utilizes a secret value known to the firewall, IP address information, and a HASH function, wherein the secret value is not known to the second node;

in response to receiving the TCP SYN request packet, sending an additional transport control protocol (TCP) packet to the second node, where the additional TCP packet does not have a SYN or ACK flag but does comprise a sequence value ("seq") equal to the seq of the TCP SYN request packet;

in response to receiving a transport control protocol reset (TCP RST) packet from the second node, verifying that the seq in the TCP RST packet matches the ack_seq of the SYN|ACK packet and, if it does, designating the connection with the second node as an authorized connection;

after designating the connection with the second node as an authorized connection, using the seq of an additional received TCP RST packet to construct a synchronization (SYN) packet similar to the original TCP SYN request packet; and sending the constructed SYN packet to the first node to further enable a secure connection.

15. The computer-readable medium of claim 14, wherein the trigger condition comprises memory consumption resulting from connection attempts equaling a threshold value.

16. The computer-readable medium of claim 14, wherein the Stateful mode comprises:

in response to receiving a transport control protocol synchronization (TCP SYN) request packet that is sent towards a first node from a second node, said TCP SYN request packet comprising a sequence value ("seq"), sending to the second node an acknowledgement and synchronization (SYN|ACK) packet, said SYN|ACK packet comprising a seq and an ack_sequence value ("ack_seq"), where ack_seq of the SYN|ACK packet is not equal to the TCP SYN request packet's seq+1; and in response to receiving a transport control protocol reset (TCP RST) packet from the second node, verifying that the seq in the TCP RST packet matches the ack_seq of the SYN|ACK packet and, if it does, designating the connection with the second node as an authorized connection.

17. A wireless network enabled to transfer packet data between a wireless node and a data communication network, comprising:

a wireless network security component, said wireless network security component comprising:

means for sending, in response to receiving a transport control protocol synchronization (TCP SYN) request packet that is sent towards a first node from a second node, said TCP SYN request packet comprising a sequence value ("seq"), to the second node an acknowledgement and synchronization (SYN|ACK) packet, said SYN|ACK packet comprising a seq and an ack_sequence value ("ack_seq"), where ack_seq of the SYN|ACK packet is not equal to the TCP SYN request packet's seq+1, wherein the ack_seq of the SYN|ACK packet is determined by a function that utilizes a secret value known to the firewall, IP address information, and a HASH function, wherein the secret value is not known to the second node;

means for verifying, in response to receiving a transport control protocol reset (TCP RST) packet from the second node, that the seq in the TCP RST packet matches the ack_seq of the SYN|ACK packet and, if it does, for designating the connection with the second node as an authorized connection;

means for sending, in response to receiving the TCP SYN request, an additional transport control protocol (TCP) packet to the second node, where the additional TCP packet does not have a SYN or ACK flag but does comprise a sequence value ("seq") equal to the seq of the TCP SYN request packet;

means for using, after designating the connection with the second node as an authorized connection, the seq of an additional received TCP RST packet to construct a synchronization (SYN) packet similar to the original TCP SYN request packet; and means for sending the constructed SYN packet to the first node to further enable a secure connection.

18. The wireless network of claim 17, wherein a wireless node is the first node and a data communication network is the second node.

19. The wireless network of claim 17, wherein a data communication network is the first node and a wireless node is the second node.

20. The wireless network of claim 17, wherein the ack_seq of the SYN|ACK packet is determined by:

$$ack\_seq = \mathrm{make32}(HASH(LK|IP|TCP)),$$

where LK is secret value, IP refers to a result of a concatenation of source IP address and destination IP address found in the SYN packet, TCP refers to a result of a concatenation of TCP port numbers, and the function make32 takes the string produced by the HASH function and generates a 32-bit number.

21. The wireless network of claim 17, further comprising:

means for sending, in response to receiving the TCP SYN request, an additional transport control protocol (TCP) packet to the second node, where the additional TCP packet does not have a SYN or ACK flag but does comprise a sequence value ("seq") equal to the seq of the TCP SYN request packet;

means for using, after designating the connection with the second node as an authorized connection, the seq of an additional received transport control protocol reset (TCP RST) packet to construct a synchronization (SYN) packet similar to the original TCP SYN request packet; and means for sending the constructed SYN packet to the first node to further enable a secure connection.

* * * * *